United States Patent  (10) Patent No.: US 9,132,373 B2
Loggins et al.  (45) Date of Patent: Sep. 15, 2015

(54) CLEAN SCREEN AIR FILTRATION SYSTEM

(76) Inventors: Angela Loggins, Richardson, TX (US);
Tamara S. Loggins, Richardson, TX (US)

( * ) Notice: Subject to any disclaimer, the term of this patent is extended or adjusted under 35 U.S.C. 154(b) by 101 days.

(21) Appl. No.: 12/981,591

(22) Filed: Dec. 30, 2010

(65) Prior Publication Data

US 2011/0225939 A1 Sep. 22, 2011

Related U.S. Application Data (60) Provisional application No. 61/315,973, filed on Mar. 21, 2010.

(51) Int. Cl.
*B01D 46/00* (2006.01)
*B01D 46/10* (2006.01)
*B01D 46/42* (2006.01)
*F24F 13/08* (2006.01)

(52) U.S. Cl.
CPC .............. *B01D 46/10* (2013.01); *B01D 46/001* (2013.01); *B01D 46/0005* (2013.01); *B01D 46/008* (2013.01); *B01D 46/4227* (2013.01); *F24F 13/085* (2013.01); *B01D 2265/023* (2013.01); *B01D 2265/04* (2013.01); *Y10T 29/49826* (2015.01)

(58) Field of Classification Search
CPC ........ B01D 46/01; B01D 46/05; B01D 46/08; B01D 46/10; B01D 46/4227; B01D 2265/04; B01D 2265/23
USPC .................. 95/273; 55/357, 385.1, 496, 506, 55/510–511, DIG. 31, 385.6, 491, 486, 55/495, 504, 524; 454/309, 328; 96/17, 96/134
See application file for complete search history.

(56) References Cited

U.S. PATENT DOCUMENTS

| 5,240,487 | A  | * | 8/1993  | Kung .............................. 96/222 |
| 5,643,081 | A  |   | 7/1997  | Klein |
| 5,690,719 | A  | * | 11/1997 | Hodge ............................. 96/17 |
| 5,772,713 | A  | * | 6/1998  | Salinas et al. ................... 55/496 |
| 6,185,097 | B1 | * | 2/2001  | Behl ............................. 361/695 |
| 6,257,976 | B1 | * | 7/2001  | Richardson, III ............. 454/309 |
| 6,361,578 | B1 |   | 3/2002  | Rubinson |
| 6,623,540 | B2 |   | 9/2003  | Clayton et al. |
| 6,814,660 | B1 |   | 11/2004 | Cavett |
| 6,941,630 | B2 | * | 9/2005  | Wynn .......................... 29/401.1 |
| 6,942,710 | B2 |   | 9/2005  | Milano |
| 2003/0226338 | A1 | * | 12/2003 | Yair et al. ..................... 55/385.6 |
| 2010/0227545 | A1 | * | 9/2010  | Frois ............................ 454/358 |

* cited by examiner

*Primary Examiner* — Jason M Greene
*Assistant Examiner* — Karla Hawkins
(74) *Attorney, Agent, or Firm* — Wilson Daniel Swayze, Jr.

(57) ABSTRACT

A clean screen air filtration system for increasing the filtration of allergens, dust particles, and airborne pollutants from air exiting an air duct. In a preferred embodiment, a user may removably attach a clean screen air filtration system assembly to an existing air duct via a magnetic fastening strip affixed along a backside of an air filter frame. The magnetic fastening strip may provide an efficient means for removably attaching the clean screen air filtration system assembly to the outside of an existing air duct manufactured from a metallic material. The clean screen air filtration system assembly may comprise at least one replaceable air filter. The air filter may comprise a ventilation screen having a plurality of miniature, slatted filter apertures, a flexible air filter frame, and an air filter handle/tab. The user may slidably insert air filter via the filter handle/tab into a filter track located inside a gap region integrated within the air filter frame. The gap region may comprise a width and depth just large enough to receive the air filter such that only the filter handle/tab extends beyond the air filter frame for ease of replacement.

10 Claims, 7 Drawing Sheets

CLEAN SCREEN AIR FILTRATION SYSTEM

CROSS-REFERENCE TO RELATED APPLICATION

The present application is related to and claims priority from prior Provisional Application Ser. No. 61/315,973, filed Mar. 3, 2010 which application is incorporated herein by reference.

BACKGROUND OF THE INVENTION

1. Field of the Invention

The present invention relates generally to the field of air filters and more specifically relates to an air filtering system for removable attachment to an existing air duct vent.

2. Description of the Related Art

Air duct vents provide an important function in buildings and homes. An air duct ventilation system is often used to provide a passageway from an air repository into rooms and sections of a dwelling or building allowing for the circulation of air. At the mouth of the air duct passageway there typically may be a metallic air duct opening covering with slatted openings allowing for the passage of air while filtering out balls of accumulated dust and larger particles. However, unfortunately indoor air that has been circulated through a duct system often contains more pollutants than the air outside. A majority of air duct covering screens enable pollutants in the air to freely pass through unfiltered. The occupants inside a building with an ordinary air duct covering may find that breathing the indoor air aggravates respiratory conditions. Moreover, many people have allergies to dust, mold, allergens, other air borne pollutants and the like and have difficulty breathing in a room that contains a duct system. Pollen and other airborne particles may irritate the lungs and throat, especially while sleeping at night. A more efficient filtration system is needed.

Various attempts have been made to solve the above-mentioned problems such as those found in U.S. Pat. Nos. 5,643,081, 6,257,976, 6,942,710, 6,814,660, 6,361,578, 6,623,540, 6,241,794, 6,241,603, 5,947,815, and 5,525,145. This prior art is representative of ventilation screens for air ducts. None of the above inventions and patents, taken either singly or in combination, is seen to describe the invention as claimed.

Ideally, an air filtration system for an air duct should operate reliably and be manufactured at a modest expense. Thus, a need exists for a reliable air filter system for removable attachment to an air duct to reduce the passage of pollutants and allergens from passing there-through and to avoid the above-mentioned problems.

BRIEF SUMMARY OF THE INVENTION

In view of the foregoing disadvantages inherent in the known air filter system art, the present invention provides a novel clean screen air filtration system for ventilation. The general purpose of the present invention, which will be described subsequently in greater detail, is to provide a clean screen air filtration system assembly for removable attachment to an existing air duct opening to inhibit allergens, dust particles, and airborne pollutants from passing through an air duct opening/system.

The present invention holds significant improvements and serves as a clean screen air filtration system. In a preferred embodiment, a user may removably attach a clean screen air filtration system assembly to an existing air duct via magnetic strips affixed along the backside of an air filter frame. In the preferred embodiment, the magnetic fastening strips on the backside of clean screen air filtration system provide an efficient removably attachable air filter securement means to an existing air duct vent manufactured from a metallic material. The clean screen air filtration system assembly may comprise at least one replaceable air filter. The air filter may comprise a ventilation screen having a plurality of miniature, slatted filter apertures, a flexible air filter frame, and an air filter handle/tab. The user may slidably insert air filter via the filter handle/tab into a filter track located inside a gap region integrated within air the air filter frame. The gap region may comprise a width and depth just large enough to receive the air filter such that only the filter handle/tab extends slightly beyond or behind the air filter frame for accessibility.

In an "in-use" condition, the air filter of clean screen air filtration system serves to reduce the amount of allergens, dust, and air borne pollutants from passing through the air duct cover. By removably attaching the clean screen air filtration system to the outside of an existing air duct ventilation cover, a secondary shield is thereby created, serving to inhibit smaller unwanted particles from penetrating into the room or area that is being served by the air duct. The ventilation screen of the present invention comprises a plurality of slatted filter apertures. The filter apertures provide for increased surface area that may increase the amount of contact with the air flowing there-through to remove particulates more effectively and efficiently. As such, the ventilation screen may serve to filter air pollutants, dust particles, mold, and other allergens that otherwise may pass through an existing air duct cover. After a period of time, the air filter may be replaced by slidably removing the current air filter and replacing it with a new air filter. Air filters may further be recycled augmenting the economical and environmental-friendliness of clean screen air filtering system.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, clean screen air filtration system, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a clean screen air filtration system assembly for removable attachment to an existing air duct opening to inhibit allergens, dust particles, and airborne pollutants from passing through an air duct opening. The present invention acts as an aesthetic secondary filtering means as described herein.

Figure 1:
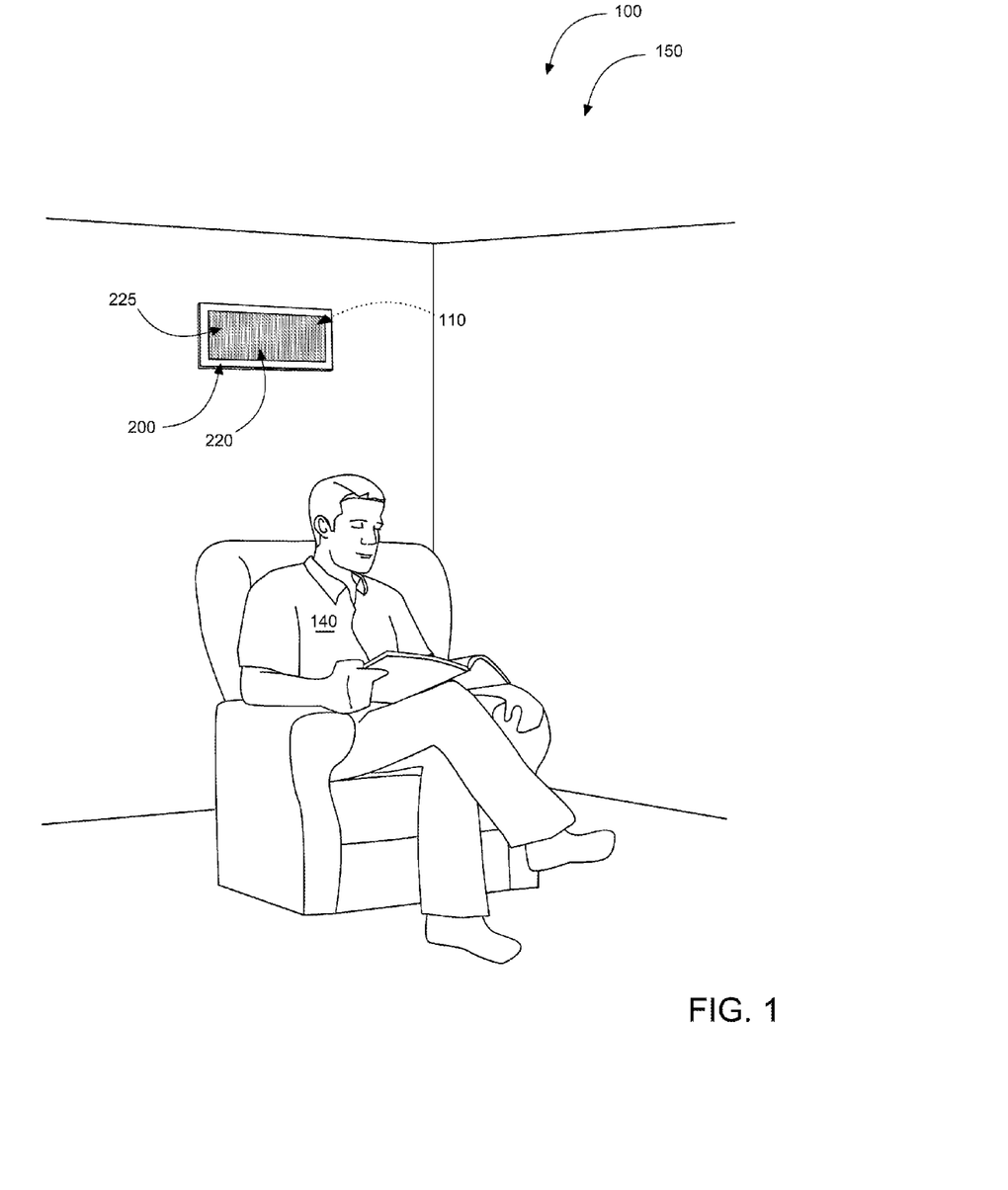
FIG. 1 shows a perspective view illustrating a clean screen air filtration system in-use according to an embodiment of the present invention

Referring to the drawings by numerals of reference there is shown in FIG. 1, clean screen air filtration system 100 in an in-use condition 150. Clean screen air filtration system 100 may comprise clean screen air filtration system assembly 104 for removable attachment to existing air duct 110. During use, air filter 220 of clean screen air filtration system assembly 104 may comprise ventilation screen 225 that may serve to substantially inhibit the penetration of allergens 503, dust 504, and airborne pollutants 505 from contaminating clean air 120 allowing for a more desirable breathing experience for user 140. In the preferred and alternative embodiments of the present invention disclosed here-in, clean screen air filtration system 100 may generally comprise clean screen air filtration system assembly 104 comprising air filter frame 200 and air filter 220. Additional air filters 220 may be included or purchased separately.

Figure 2:
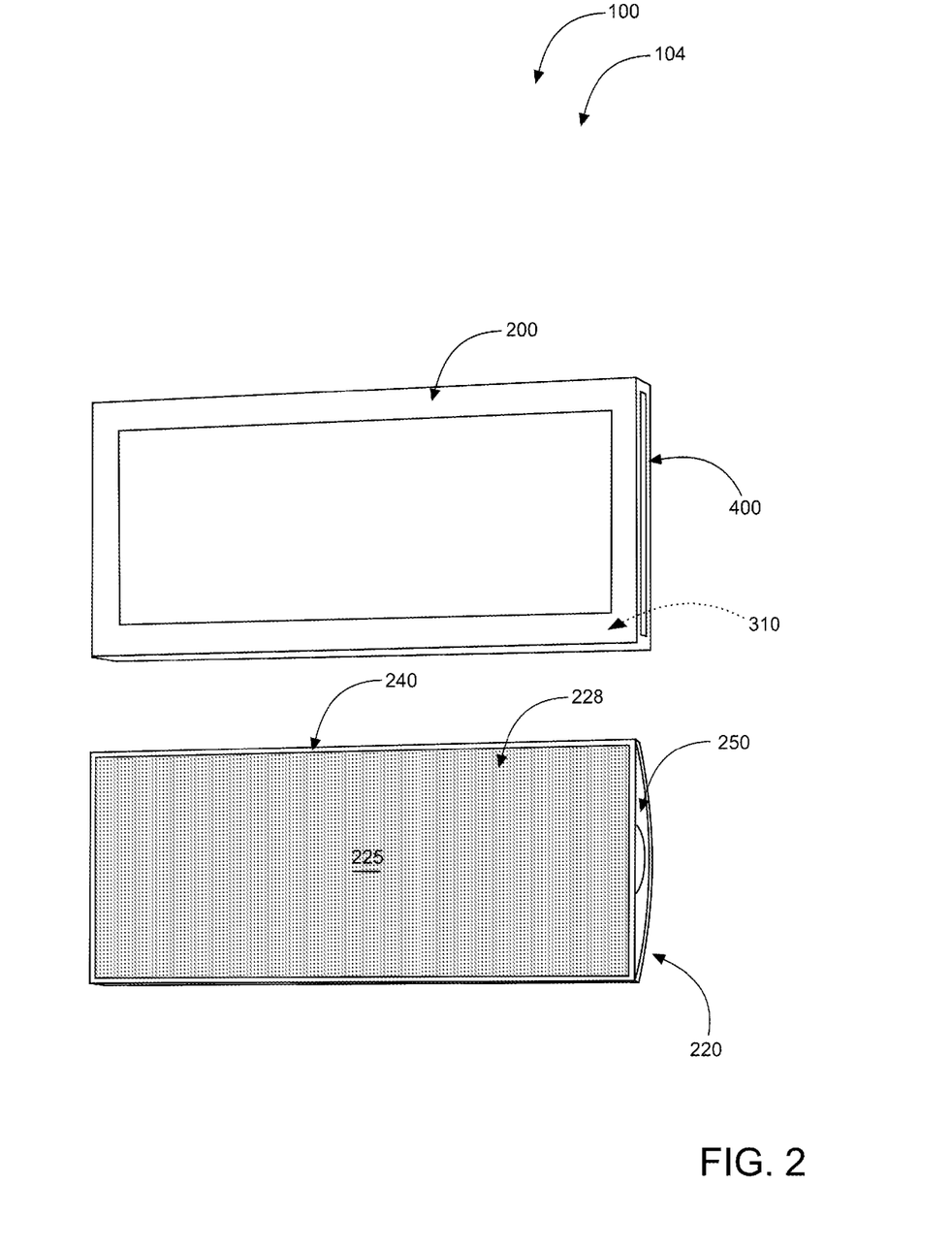
FIG. 2 is a perspective view illustrating a clean screen air filtration system ventilation assembly comprising an air filter frame and an air filter according to an embodiment of the present invention of FIG. 1.

Referring now to FIG. 2, air filter frame 200 may comprise a rectangular-shaped frame with a hollow gap region 400 to suitably receive air filter 220. In an assembled condition, air filter 220 may comprise ventilation screen 225 having plurality of filter apertures 228, air filter affixed siding 240, and air filter handle 250 or air filter tab. Ventilation screen 225 may be securably installed inside air filter affixed siding 240. Air filter 220 may further comprise air filter handle 250 or air filter tab attached to side of air filter affixed siding 240. In operation, air filter 220 may be slidably inserted into air filter frame 200 via air filter handle 250 or air filter tab. It should be appreciated that air filter handle 250 or air filter tab may be coupled to air filter affixed siding 240 in other positions/locations if desired. Clean screen air filtration system 100 may be available in various sizes in order to accommodate different vents. Additionally, the air filter frame 200 may come in different colors and designs, such as solid colors, wood, brass, copper, silver, gold or fish, horses, trains, doll houses, etc and the air filter 220 may come in solid colors, prints, mosaic art, impressionists paintings, Japanese writing, etc so that the user 140 may mix-and-match different air filter frames 200 to different air filters 220 to create an individual desirable look.

Ventilation screen 225 may comprise a semi-rigid mesh material having plurality of filter apertures 228 permitting penetration of air 120. In a preferred embodiment, filter apertures 228 may be slatted at an angle. In such a manner, air 120 passing through ventilation screen 225 must come into contact with a greater amount of surface area as the air particles must pass through at an angle as a result of the slatted design of ventilation screen 225. This additional contact area with ventilation screen 225 enables an increased amount of allergens 503, dust 504, and airborne pollutants 505 having a density larger than clean air molecules to be collected by filter apertures 228 of ventilation screen 225 allowing for the passage of air 120 which may be cleaner and healthier to breath. It should be appreciated that the present invention as installed may comprise secondary room filtering means and air flow direction control.

Figure 3:
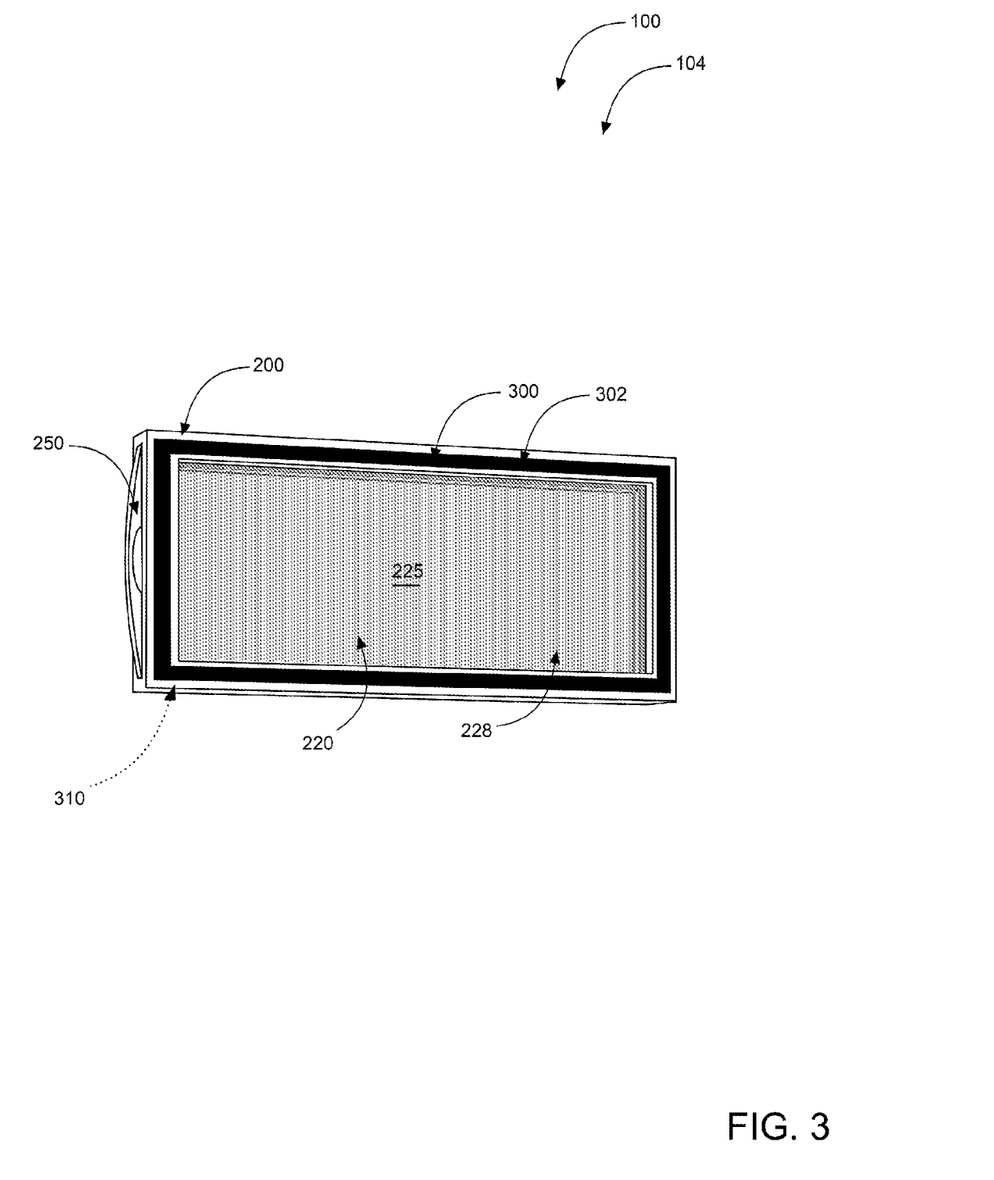
FIG. 3 is a rear perspective view illustrating a back portion of the air filter frame comprising a magnetic fastening strip along all four sides according to an embodiment of the present invention of FIG. 1.

In an alternative embodiment of clean screen air filtration system 100, clean screen air filtration system assembly 104 may comprise magnetic fastening strip 300 located along all four sides on the backside of clean screen air filtration system 100. As seen in FIG. 3, magnetic fastening strip 300 may be removably attached by user 140 from air duct 110. Magnetic fastening strip 300 may be severable or non-severable in alternate embodiments.

Figure 4:
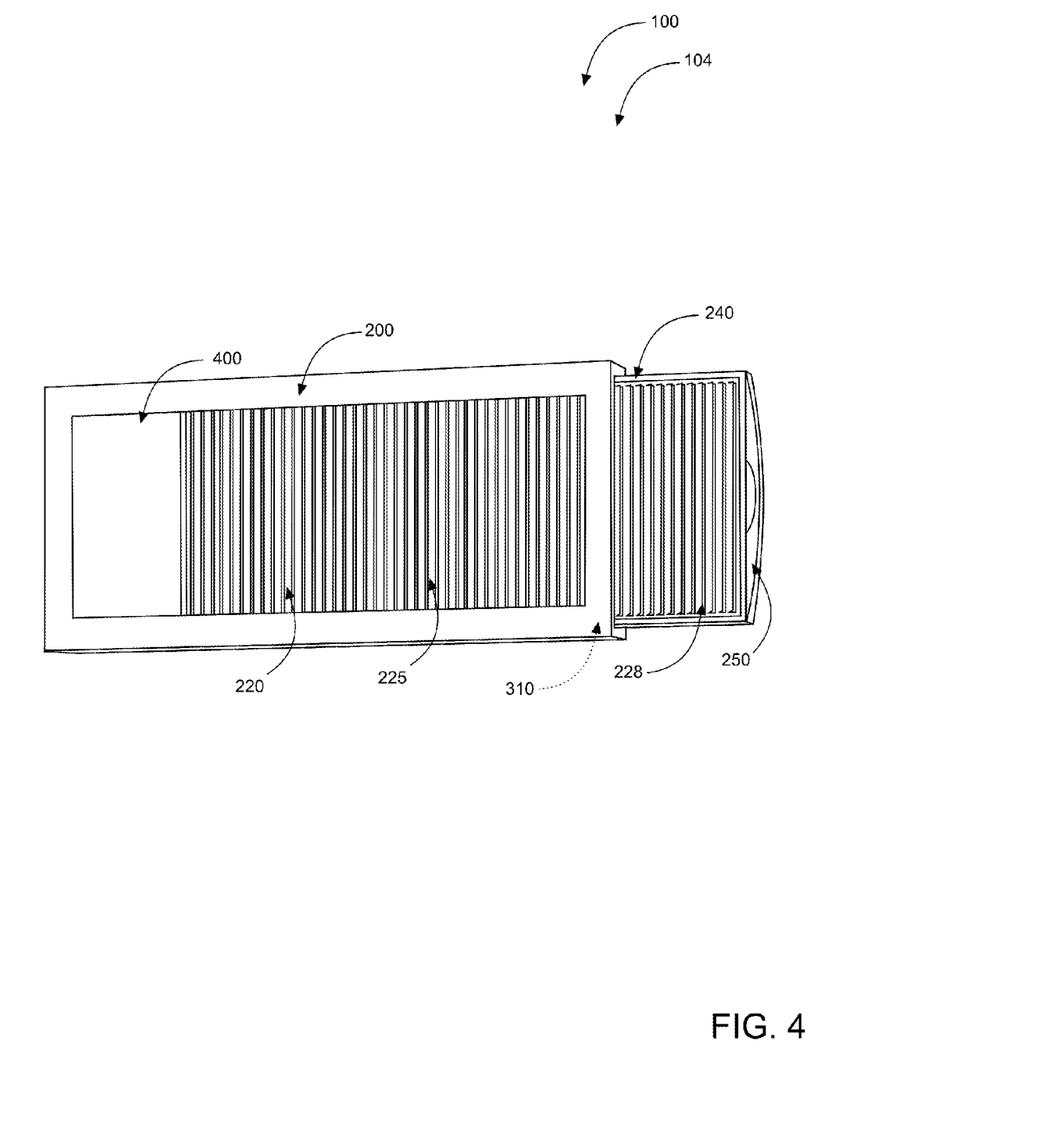
FIG. 4 is a front perspective view illustrating the air filter being slidably inserted into the air filter frame according to an embodiment of the present invention of FIG. 1.

Referring now to FIG. 3, illustrating a rear perspective view of clean screen air filtration system assembly 104 comprising air filter 220 inserted into air filter frame 200. Air filter frame 200 may comprise filter track 310 located within gap region 400 to slidably receive air filter 220. As can best be seen in FIG. 3, when air filter 220 is completely installed into air filter frame 200 via filter track 310, air filter handle 250 or air filter tab may or may not extrude slightly outward from air filter frame 200 thereby enabling user 140 to slidably remove air filter 220 by pulling on air filter handle 250 while air filter frame 200 has been unattached from air duct 110. This will enable user 140 to easily replace air filter 220 when needed as seen in FIG. 4.

Still referring to FIG. 3, air filter frame 200 may further comprise magnetic fastening strips 300 affixed to an outer perimeter of backside of air filter frame 200 located along all four sides. Air filter frame 200 may be attachable to existing air duct 110 comprising ferrous material via magnetic fastening strips 300. In such a manner, clean screen air filtration system assembly 104 may be removably installable to air duct 110 with convenience and relative ease. In an alternative embodiments, clean screen air filtration system assembly 104 may comprise non-magnetic fastening strip 302 using high-grade bonding adhesive for attachment over magnetic fastening strip 300 thereby allowing clean screen air filtration system assembly 104 to be non-removably attached to air duct 110, wherein air duct 110 may comprise a non-ferrous material.

Figure 5:
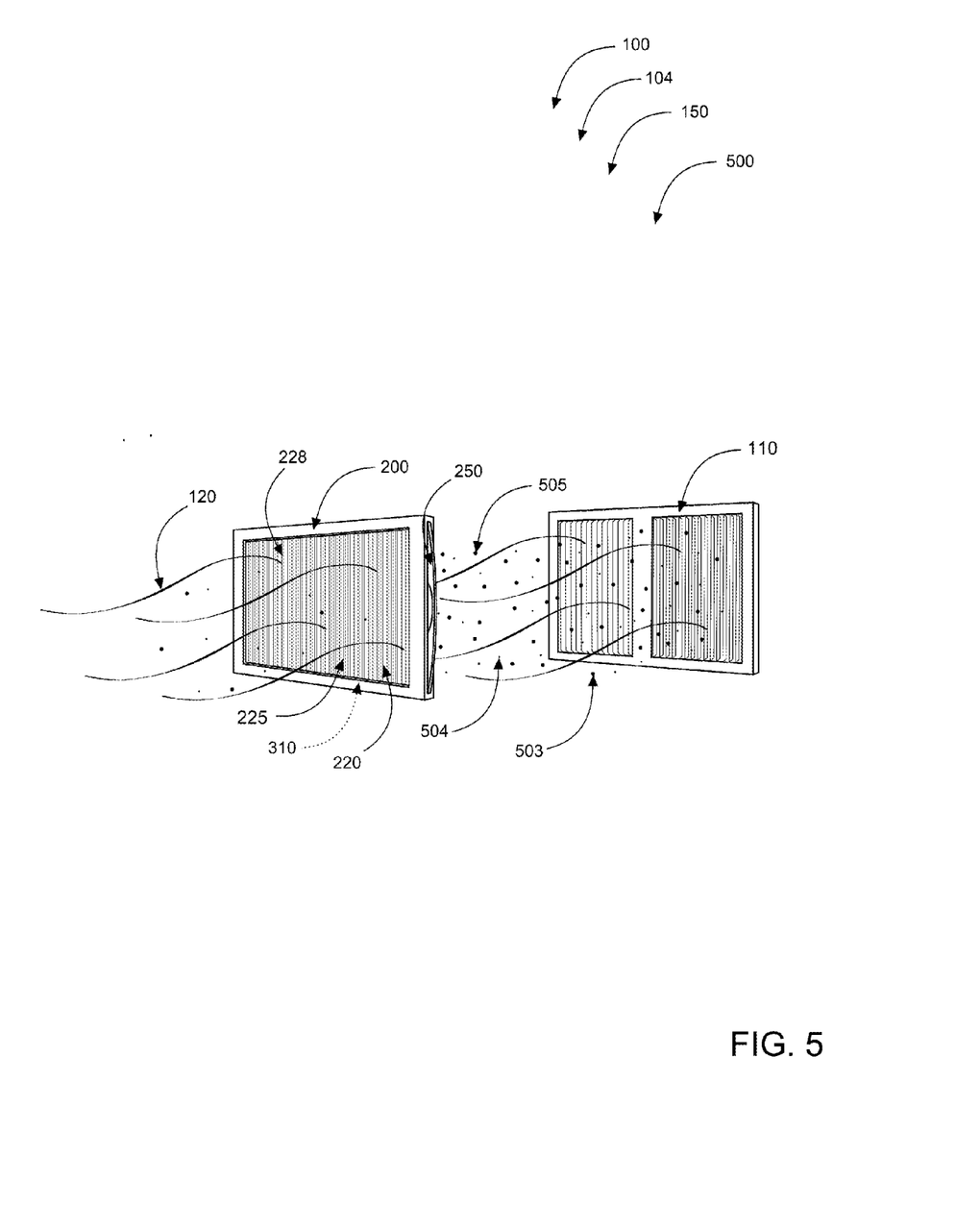
FIG. 5 is a magnified side perspective view illustrating air being filtered by the clean screen air filtration system attached to an air duct according to an embodiment of the present invention of FIG. 1.

Referring now to FIG. 5, illustrating filtration process 500 of clean screen air filtration system 100. Air 120 circulating through air duct 110 may generally contain allergens 503, dust 504, and airborne pollutants 505 all of which may aggravate the respiratory system of user 140 breathing in unfiltered air 120. As can be seen in FIG. 5, ventilation screen 225 of clean screen air filtration system assembly 104 may comprise a plurality of slatted filter apertures 228 which may serve to inhibit the passage of allergens 503, dust 504, and airborne pollutants 505.

Figure 6:
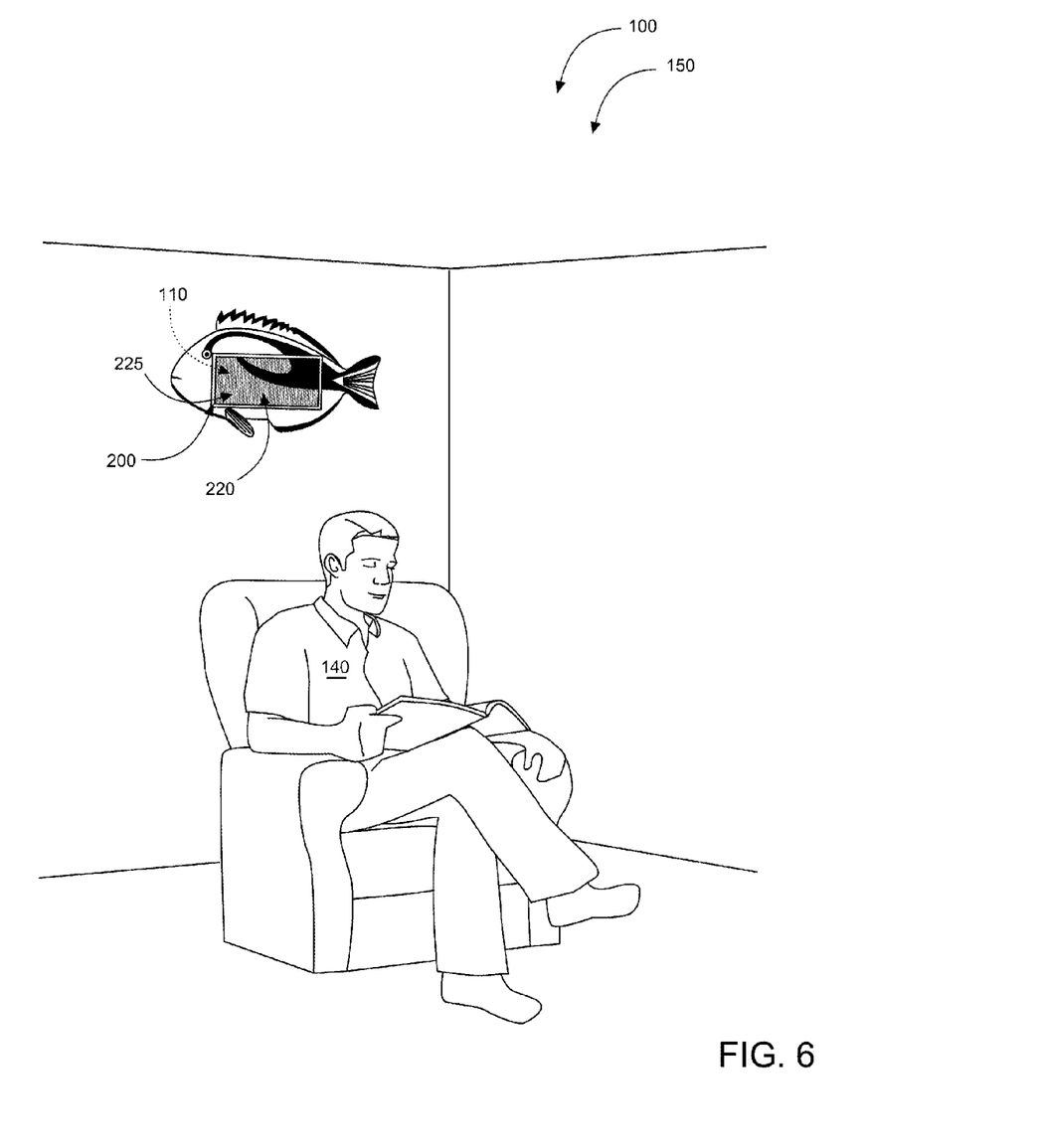
FIG. 6 is a perspective view illustrating the clean screen air filtration system in an in-use condition comprising an aesthetic design according to an alternative embodiment of the present invention.

Referring now to FIG. 6, showing an alternative embodiment of clean screen air filtration system 100 comprising a décor-matchable camouflage. In the embodiment of clean screen air filtration system 100 as seen in FIG. 6, the design of air filter frame 200, the air filer 220 and ventilation screen 225 may coincide with one another to create a continuation themed design that may be attached to the air duct 110 via magnetic fastening strip 300 located along all four sides on the backside of the air filter frame 200. In such a manner, clean screen air filtration system 100 may comprise a camouflaging effect, blending into a larger design, artwork or the shape-design of another animate or inanimate object. Further, filter apertures 228 of ventilation screen 225 may comprise a slatted design adding a unique texture within the design while providing for increased filtration of allergens 503, dust 504, and airborne pollutants 505. It should be appreciated that many other designs are feasible and the present invention provides a secondary filtering means, a method for directing air flow and an aesthetically pleasing yet functional air filtering means by the user 140.

Clean screen air filtration system assembly 104 may be sold as kit 650 comprising the following parts: at least one air filter frame 200 having magnetic fastening strip 300 attached to back portion of the air filter frame 200, at least one air filter 220 comprising ventilation screen 225, and air filter handle 250; and at least one set of user instructions. Clean screen air filtration system 100 may be manufactured and provided for sale in a wide variety of sizes, shapes and designs for a wide assortment of applications. Kit 650 may further comprise a non-magnetic fastening strip 302 using high-grade bonding adhesive for attachment over magnetic fastening strip 300 for user-preferred self-attachment of air filter frame 200 to air duct 110 comprising a non-ferrous material. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

Figure 7:
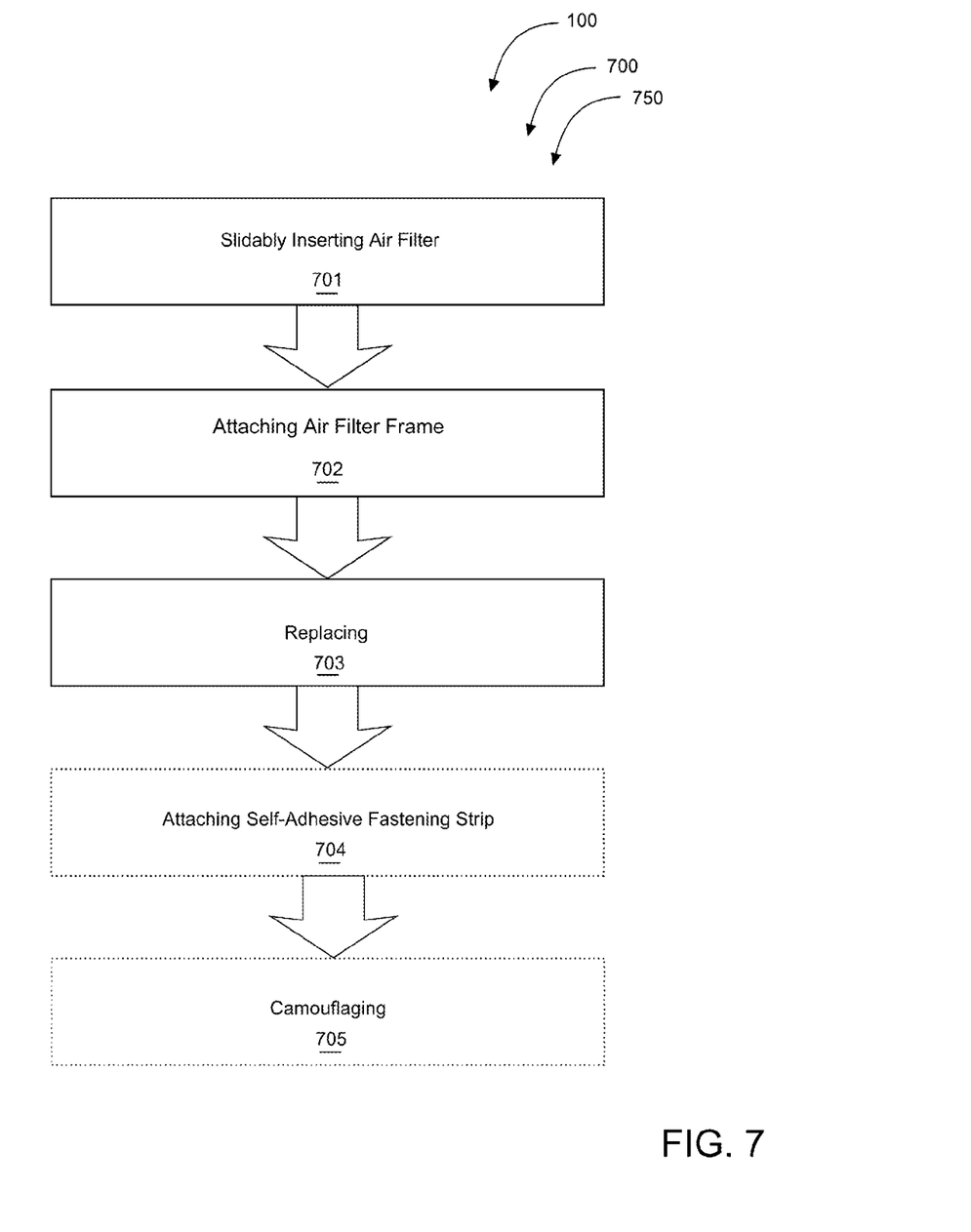
FIG. 7 is a flowchart illustrating a method of use according to an embodiment of the present invention of FIGS. 1-6.

Referring now to FIG. 7, showing a flowchart 750 illustrating a method of use 700 according to a preferred embodiment of the present invention of FIGS. 1-6. Method of use 700 for removably attaching clean screen air filtration system 100 to air duct 110 preferably comprising the steps of: step one 701 slidably inserting air filter 220 into air filter frame 200; step two 702 magnetically attaching air filter frame 200 to air duct 110; step three 703 replacing air filter 220 by removably attaching air filter frame 200 from air duct 110 and slidably inserting air filter 220 into air filter frame 200 and reattaching air filter frame 200 to air duct 110.

Still referring to FIG. 7, an optional step four 704 may comprise the steps of: step four 704 attaching non-magnetic fastening strip 302 comprising a high-grade bonding, self-adhesive substance over magnetic fastening strip 300 for non-removably attaching air filter frame 200 to air duct 110 comprising a non-ferrous material; and step five 705 camouflaging clean screen air filtration system assembly 104 by matching the air filter frame 200 with the air filter 220 thereby creating a décor aesthetically pleasing clean screen air filtration system 100. It should be noted that step four 704 and step five 705 are optional steps and may not necessarily be implemented in all cases. Optional steps of method of use 700 are illustrated using dotted lines in FIG. 7 so as to distinguish them from the other steps of method of use 700. It should also be noted that the steps described in the method of use can be carried out in many different orders according to user preference. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A clean screen air filtration system for removable attachment to an air duct, the clean screen air filtration system comprising:
    at least one unitary-body air filter comprising a ventilation screen attached to and peripherally framed by a siding having a handle at one end of said siding;
    an air filter frame comprising having a single airflow opening and a filter track configured to slideably receive said unitary-body air filter, wherein, when attached to an air duct, said airflow opening substantially overlaps an opening of said air duct, wherein when said unitary-body air filter is fully inserted into said filter track, said handle of said siding projects from said filter track; and
    a magnetic fastening strip affixed to the backside periphery of said air filter frame, wherein said magnetic fastening strip is configured to substantially align with and removably attach to along all four back sides of a magnetically-permeable peripheral frame of an air duct,
    wherein said ventilation screen has filter apertures sized to reduce the passage of allergens, mold, dust, and other airborne particles and pollutants from exiting said single opening of said air filter frame into an interior room.

2. The clean screen air filtration system of claim 1 wherein said ventilation screen comprises extruding slats thereby enlarging the surface area of said ventilation screen.

3. The clean screen air filtration system of claim 1, further comprising double-sided self-adhesive substance tape.

4. The clean screen air filtration system of claim 1, further comprising framing artwork, wherein said framing artwork is attachable to a wall portion surrounding an air duct, the framing artwork has an aperture sized to receive said air filter frame, when said air filter frame is attached to said air duct.

5. The clean screen air filtration system of claim 4, wherein said unitary-body air filter comprises a decor-matchable design thereby camouflaging said unitary-body air filter.

6. A method of filtering air from an air duct comprising the steps of:
    slidably inserting a unitary-body air filter into a filter track of an air filter frame, wherein said unitary-body air filter comprises a ventilation screen attached to and peripherally framed by a siding having a handle at one end of said siding; and
    magnetically attaching said air filter frame to magnetically-permeable peripheral frame of an air duct via a magnetic fastening strip, wherein the air filter frame comprises a single airflow opening, wherein, when attached to an air duct, said airflow opening substantially overlaps an opening of said air duct, wherein when said unitary-body air filter is fully inserted into said filter track, said handle of said siding projects from said filter track;

and wherein the a magnetic fastening strip is removably attached to along all four back sides of the magnetically-permeable peripheral frame of the air duct.

7. The method of filtering air from an air duct of claim 6, further comprising the step of replacing said air filter when said air filter has been sufficiently used.

8. The method of filtering air from an air duct of claim 6, further comprising the step of camouflaging said clean screen air filtration system ventilation assembly to match a decor of a room.

9. The method of filtering air from an air duct of claim 6, further comprising the step of removably attaching said clean screen air filtration system ventilation assembly from said air duct.

10. The method of filtering air from an air duct of claim 6, further comprising the step of camouflaging said unitary-body air filter by attaching framing artwork to a wall portion surrounding an air duct, wherein said unitary-body air filter has matching decor to said framing artwork.

* * * * *